R. HUFFMAN & P. BIRKES.
FEED BOX.
APPLICATION FILED NOV. 5, 1915.
1,198,353.
Patented Sept. 12, 1916.
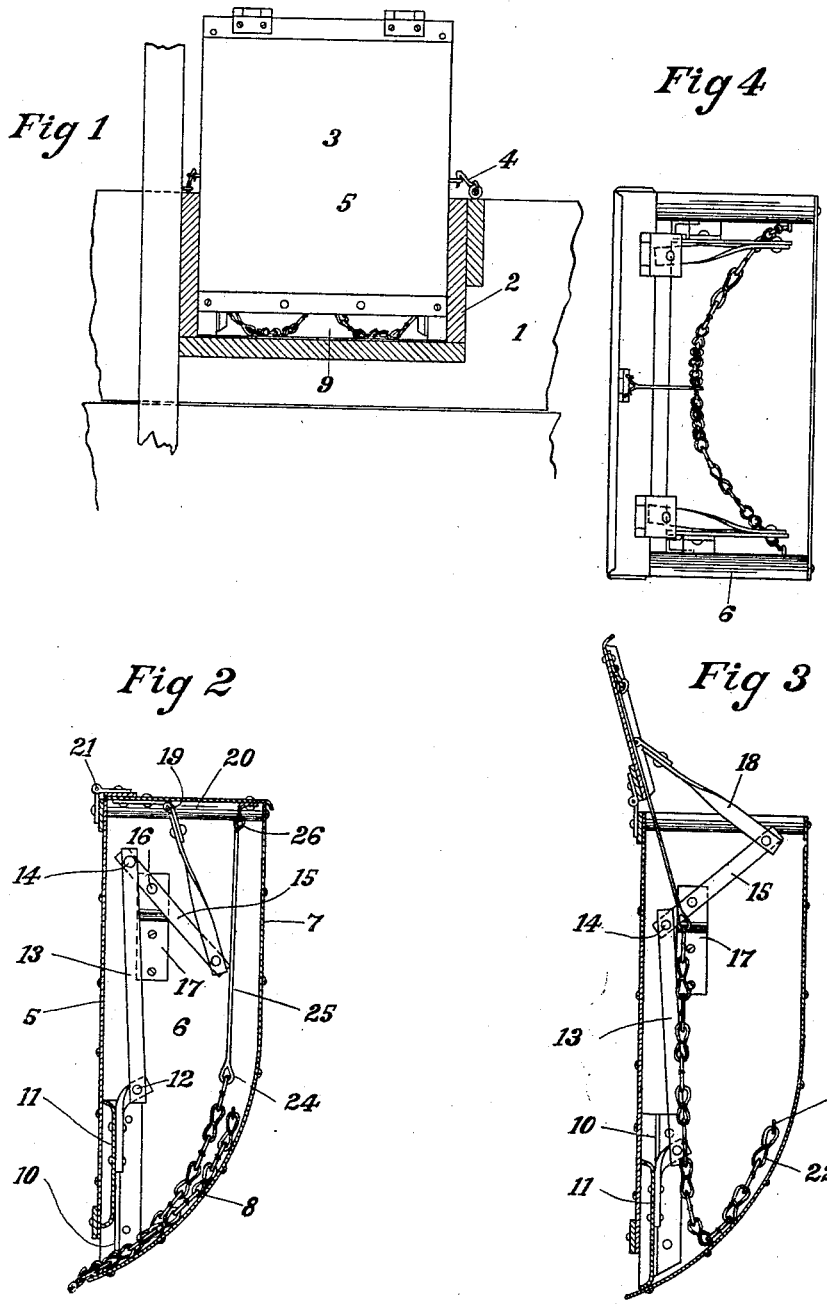

UNITED STATES PATENT OFFICE.

ROLEY HUFFMAN, OF DECATUR, AND PINCKNEY BIRKES, OF MOUNT PULASKI, ILLINOIS.

FEED-BOX.

1,198,353.  Specification of Letters Patent.  Patented Sept. 12, 1916.

Application filed November 5, 1915. Serial No. 59,741.

*To all whom it may concern:*

Be it known that we, ROLEY HUFFMAN, a citizen of the United States, residing at Decatur, in the county of Macon and State of Illinois, and PINCKNEY BIRKES, a citizen of the United States, residing at Mount Pulaski, county of Logan, and State of Illinois, have invented certain new and useful Improvements in Feed-Boxes, of which the following is a specification.

Our invention relates to improvements in feed-boxes for horses, cattle and the like, and the principal purpose of the invention is to provide such a box which will discharge feed, particularly small or ground grain, slowly so that the animal will not choke or eat hurriedly, as is the case when the feed is dumped bodily into the ordinary feed-box.

A further object of this invention is the provision of means whereby the animal may prevent the feed material in the feed-box from becoming clogged and failing to discharge.

A further object is the provision of such a device which is in the form of a box, having a comparatively restricted opening at its bottom and having a gate or valve controlling the said opening, said gate or valve being connected to the lid of the device so that when the lid is raised to replenish the supply of the material in the feed-box, the gate or valve will close the opening and prevent the discharge of the feed, and connections also being arranged so that when the lid of the feed-box is closed, the gate or valve will be opened so as to permit the feed to be discharged into the feed-box of the manger.

Further objects include improvements in details of construction and arrangement, whereby a simple and effectively operating device is provided, which may be applied to the ordinary manger, and feed-box at present in use, with as little difficulty as possible and which will serve to discharge the feed slowly and evenly.

To the accomplishment of the foregoing and such other objects as may hereinafter appear, our invention consists in the combination, construction and arrangement of parts hereinafter described, and then sought to be defined in the appended claims, reference being had to the accompanying drawing forming a part hereof, and which shows merely for the purpose of illustrative disclosure, a preferred embodiment of our invention, it being understood that various changes may be made in practice within the scope of the claims, without digressing from our inventive idea.

In the drawings Figure 1 represents a feed-box constructed according to our invention, shown in position in an ordinary feed-box of the manger, which is shown in section; Fig. 2 is a vertical longitudinal section of the feed-box showing the lid in closed position and the gate or valve in open position; Fig. 3 is a similar view showing the lid in its raised position and the gate or valve in its closed position; Fig. 4 is a top plan view of the device in the position shown in Fig. 3.

It is found in practice that in feeding with the ordinary open form of feed-box mounted in the manger, that the horses, cattle and other animals ordinarily will feed too fast, resulting in choking and also insufficient mastication, and we have evolved a device which will obviate this difficulty and result in feeding a comparatively small and limited quantity of the feed evenly and regularly into the open feed-box in the manger, it being understood that the feed-box constructed according to our invention, is positioned in the regular open feed-box.

Referring now to the drawings for a detailed description of our invention and first to Fig. 1, the numeral 1 designates the ordinary manger having the open feed-box 2 provided therein, as is well understood. In this open feed-box and at the rear so as to be accessible from the ordinary feed-way, we mount the feed-box 3 constructed according to our invention. This may be done readily by knocking out the rear member of the open feed-box 2 and positioning the feed-box constructed according to our invention therein, it being held in position by means of the hook and eye connections 4. This feed-box 3 is substantially rectangular in cross-section, having the front member 5, the side members 6 and the rear member 7, which is straight for the greater portion of its length, but has its lower bottom portion 8 curved, according to the corresponding curve of the side members 6, so that the material therein will be directed toward the front board or member 5. This front board or member 5 terminates short of the curved portion 8 of the rear member 7 as shown best in Fig. 1, leaving an opening 9 through which the feed is adapted to be discharged by gravity, this being due of course, to the conformation of the rear and bottom member 7 and 8. On the inside of the side members 6 and adjacent the lower portion of the front member 5, we provide the guide-ways 10 which receive the gate or valve 11 and hold it properly in place during its up and down movement. To each end of the gate or valve 11, we connect the ears 12 to which are pivotally connected links 13 which extend upward and are pivoted as at 14 to one arm of the lever 15, which lever is pivoted as at 16 on the bracket or support 17, secured on the inside of the side members 6. To the other end of the lever 15 we pivotally connect the link member 18 which is hinged or pivoted as at 19 to the lid 20, which lid is hinged as at 21 to the front member of the feed-box. As shown in Fig. 2, the lid 20 is closed and the gate or valve 11 is in its raised position, thereby permitting the feed to be discharged through the opening 9. However, when the lid is raised as shown in Fig. 3, the gate or valve 11 is moved downwardly against the curved bottom portion 8 of the rear member 7, so as to close the opening and prevent the discharge of feed therethrough, this being due to the link connections 13 and 18 with lever 15.

In addition to these features of our invention, we also provide means for preventing the feed from clogging or becoming stuck in the feed-box with the result of improper operation. This means comprises the chain or other flexible member 22 which is secured at each end to the inside of the side members 6 as at 23, and is arranged in the form of a pair of loops, which project through the opening 9 in the fashion shown in Fig. 2, and which loops are connected as at 24 to the link 25 which is connected to the lid member 20 as at 26, so that when the lid member is raised, the flexible agitator will also be raised. This feature of our invention is operated by the animals themselves, for by nosing around the opening 9, the loops of chain will be moved and the feed will therefore be agitated and any obstruction to the free discharge thereof, will be broken up and removed. This is particularly valuable in case the feed is damp or sticky. It is therefore obvious that we have provided a device which is simple in construction, efficient in operation and which is invaluable for use in connection with farms or other establishments where horses, cattle and other animals are fed.

What we claim is:—

1. A feed-box having an opening at its lower end, a valve controlling said opening, a lid for said feed-box and connections between said lid and said valve, so that when said lid is opened, said valve is closed, and when said lid is closed, said valve is open, to permit the discharge of feed from the feed-box, and flexible agitating means mounted within said box and adapted to extend beyond said opening, said flexible means being connected to said lid so as to be raised when the lid is opened and dropped when the lid is closed.

2. A feed-box comprising front, side, rear and bottom members and a lid, the rear and bottom member being curved so as to direct material toward the front member, said front member terminating short of the bottom member, so as to provide a discharge opening, guides mounted on the side members adjacent said opening, a valve mounted to slide in said guides and connections between said valve and said lid so that when the lid is opened, the valve is closed and vice versa, and flexible agitating means connected to the lid and adapted to extend through said opening to be moved by the animal feeding when the valve is open.

3. A feed-box comprising front, side, rear and bottom members and a lid, the rear and bottom member being curved so as to direct material toward the front member, said front member terminating short of the bottom member, so as to provide a discharge opening, guides mounted on the side members adjacent said opening, a valve mounted to slide in said guides and connections between said valve and said lid so that when the lid is opened the valve is closed and vice versa, and flexible agitating means adapted to extend through said opening to be moved by the animal feeding, said flexible agitating means being connected to the lid so as to be raised when the lid is raised and lowered when the lid is lowered.

4. A feed-box having a hinged lid and having a discharge opening, a flexible agitating means within said feed-box and connected to said lid so as to be raised therewith, said flexible agitating means being arranged so as to provide loops which project through the opening and are adapted to be moved by the animal feeding.

ROLEY HUFFMAN.
PINCKNEY BIRKES.

Copies of this patent may be obtained for five cents each, by addressing the "Commissioner of Patents, Washington, D. C."